United States Patent [19]

Heiermann et al.

[11] 4,224,843
[45] Sep. 30, 1980

[54] TENSIONING DEVICE FOR SIMULTANEOUSLY TENSIONING A PLURALITY OF BOLTS

[75] Inventors: Siegfried Heiermann, Waltrop; Hans Lachner, Herne; Jörg Richter, Wattenscheid; Peter Schüngel, Bork; Kurt Tögel, Witten; Hans Warnke, Herne, all of Fed. Rep. of Germany

[73] Assignee: Kloeckner Werke AG, Duisburg, Fed. Rep. of Germany

[21] Appl. No.: 973,541

[22] Filed: Dec. 26, 1978

[30] Foreign Application Priority Data

Dec. 23, 1977 [DE] Fed. Rep. of Germany ....... 2757671
Mar. 13, 1978 [DE] Fed. Rep. of Germany ....... 2810739

[51] Int. Cl.³ .............................................. B25B 29/02
[52] U.S. Cl. ................................................. 81/57.38
[58] Field of Search ...................... 81/57.38; 254/29 A

[56] References Cited

U.S. PATENT DOCUMENTS

| | | | |
|---|---|---|---|
| 3,287,999 | 11/1966 | Krecktel | 254/29 A |
| 3,362,682 | 1/1968 | Meschonat et al. | 254/29 A |
| 3,494,592 | 2/1970 | Meschonat et al. | 254/29 A |
| 3,722,332 | 3/1973 | Jones | 81/57.38 |
| 4,027,559 | 6/1977 | Wallrafen | 81/57.38 |
| 4,047,456 | 9/1977 | Scholz | 81/57.38 |

FOREIGN PATENT DOCUMENTS 1390012 4/1975 United Kingdom .................... 81/57.38
541661 3/1977 U.S.S.R. ................................. 81/57.38

*Primary Examiner*—James L. Jones, Jr.
*Attorney, Agent, or Firm*—Michael J. Striker

[57] ABSTRACT

A fluid-operated device for simultaneously pretensioning a plurality of bolts connecting a first body to a second body in which the bolts are screwed with threaded end portions thereof into corresponding threaded bores in the second body and project with clearance through bores in the first body and with opposite threaded end portions thereof beyond the first body. The device comprises a carrier member arranged on the side of the first body opposite the second body and provided with a plurality of bores through which the bolts extend with clearance, a first nut screwed on the projecting other end portion of each bolt, at least one fluid-operated piston arranged on said carrier member movable along an axis parallel to those of the bolts and engaging with an end thereof the first body so as to simultaneously tension, when operated all of the screw bolts, and a second nut on an intermediate threaded portion of each bolt turnable into engagement with the first body after the bolts have been tensioned so as to hold the bodies in tight engagement with each other by the tensioned bolts.

10 Claims, 5 Drawing Figures

TENSIONING DEVICE FOR SIMULTANEOUSLY TENSIONING A PLURALITY OF BOLTS

BACKGROUND OF THE INVENTION

The present invention relates to a device for simultaneously tensioning a plurality of bolts connecting a first body to a second body with one end face of the first body abutting against a corresponding face of the second body, in which the bolts are axially immovably secured in the region of one of the ends thereof to the second body and project from the latter with clearance through bores in the first body and beyond the latter through corresponding bores in a carrier member arranged on a side of the first body facing away from the second body, in which at least one or a plurality of cylinders are arranged forming with a piston or pistons in the cylinder pressure spaces into which a hydraulic fluid under pressure is fed and in which the cylinders and the pistons therein apply, when hydraulic fluid under pressure is fed into the aforementioned pressure spaces, tension forces onto the bolts.

Such hydraulically operated tension devices are known from the U.S. Pat. No. 4,012,026. The constructions disclosed therein have, however, the decisive disadvantage that two separate tensioning steps and a changeover step has to be carried out in order to tension all of the bolts since in each tensioning step only half of the bolts are tensioned. The operation of these known tensioning devices is, therefore, time consuming and in addition there will not be produced a uniform tension in all of the bolts.

The German Gebrausmuster No. 70 21 273 further discloses a hydraulically operated tensioning device for simultaneously tensioning a plurality of bolts, tierods or similar elements, which comprises a carrier member consisting of an upper and a lower part and in which in the upper part for each of the bolts an annular cylinder is arranged which surrounds the respective bolt to produce a tension therein.

This known tensioning device has, however, the disadvantage that any difference in the efficiency of the individual cylinders acts in an unfavorable manner on the tension results so that the individual bolts may be tensioned in a slightly different manner from each other, whereby the difference may be of a magnitude of ±2.5% of the tensioning force. A further disadvantage of this known tensioning device is that it is rather expensive to produce.

SUMMARY OF THE INVENTION

It is an object of the present invention to provide a tensioning device of the aforementioned kind, which avoids the disadvantages of such tensioning device known in the art.

It is a further object of the present invention to provide a hydraulically operated tensioning device in which all of the bolts may be tensioned simultaneously substantially to the same degree and within a very short time.

It is an additional object of the present invention to provide a hydraulically operated tensioning device which is composed of relatively few and simple parts so that the whole device may be produced at reasonable cost and will operate trouble free during extended use.

With these and other objects in view, which will become apparent as the description proceeds, the tensioning device of the present invention for simultaneously tensioning a plurality of bolts connecting a first body to a second body with one end face of the first body abutting against a corresponding face of the second body, in which the bolts are axially immovably secured in the region of one of the ends to the second body and project from the latter with clearance through bores in the first body and beyond the latter, which device mainly comprises a carrier member on the side of the first body facing away from the second body, in which the carrier member is formed with a plurality of bores therethrough respectively aligned with the bores in the first body and in which the bolts extend with clearance through the bores in the carrier member and project with end portions thereof beyond the latter, and in which each of the bolts has an intermediate threaded portion projecting beyond a face of the first body opposite said one end face. The device includes further means on the end portion of each bolt for preventing movement of the carrier member away from the first body, means cooperating with the first-mentioned means and the carrier member for simultaneously applying a tension force to all of the bolts, and a nut screwed on the intermediate portion of each bolt to be turned into engagement with the face of said first body which is opposite said one end face after the bolts have been tensioned so as to hold the first body in tight engagement with the second body by the tensioned bolts.

Preferably, the end portion of each bolt is provided with a screw thread, and the means on the end portion of each bolt preventing movement of the carrier member away from the first body is a nut screwed onto the threaded end portion of each bolt.

The means for simultaneously applying the tension forces to the bolts are fluid operated and the fluid-operated means are arranged to act between the one face of the first body and the carrier member.

According to one embodiment of the present invention, the carrier member is a rigid plate and the fluid-operated tensioning means comprise a central cylinder bore in the plate having a closed end and an opposite open end facing the first body, a piston slidably guided in this cylinder bore, projecting through the open end to engage with one end the first body and forming between its other end the closed end of the bore a pressure space into which hydraulic pressure fluid is fed.

In another embodiment the carrier member is a rigid annular member and the plurality of bores in the carrier member through which the bolts extend are arranged equally spaced from each other along a first circle coaxial with the annular member, and wherein the fluid-operated tensioning means comprise a plurality of cylinder bores having each a closed end and an open end facing said first body, a plurality of pistons respectively slidably guided in the plurality of cylinder bores and projecting through the open ends of these bores to each engage with one end the first body and each forming between its other end and the closed end of the respective cylinder bore a pressure space into which pressure fluid is fed.

In a further embodiment according to the present invention the fluid-operated tensioning means comprises an annular piston abutting with an end face thereof against the first body and being provided with a stepped annular groove extending from a face opposite the end face of the piston into the latter and having a first annular portion of greater width at said opposite face and a second portion of smaller width further spaced from said opposite face, and the likewise annular carrier member has a first annular portion slidablely arranged in a sealed manner in the first groove portion of the piston and a second annular portion slidably arranged in a sealed manner in the second groove portion to form in said first groove portion an annular pressure space into which fluid under pressure is fed.

The first- and last-mentioned embodiments have the advantage that the tension applied by the fluid-operated means is distributed in an optimal uniform manner to all of the bolts since the transmission of the tensioning forces to the bolts is carried out over the common carrier member which is very rigid and by a single piston to thus uniformly distribute the tensioning forces to all of the bolts, so that tensioning differences due to differences of friction forces of a plurality of pistons in the respective cylinders are avoided.

The second-mentioned embodiment, on the other hand, has the advantage that the tensioning forces are applied to each of the bolts without applying any bending moments to the latter.

Hydraulic tension devices according to the present invention are especially used for producing a tension in the fastening elements for manhole covers on heat exchangers, pressure containers or the like, especially since the construction according to the present invention can be built lighter and less expensive than other known constructions for this purpose.

The novel features which are considered as characteristic for the invention are set forth in particular in the appended claims. The invention itself, however, both as to its construction and its method of operation, together with additional objects and advantages thereof, will be best understood from the following description of specific embodiments when read in conjunction with the accompanying drawings.

DESCRIPTION OF THE PREFERRED EMBODIMENTS

Figure 1:
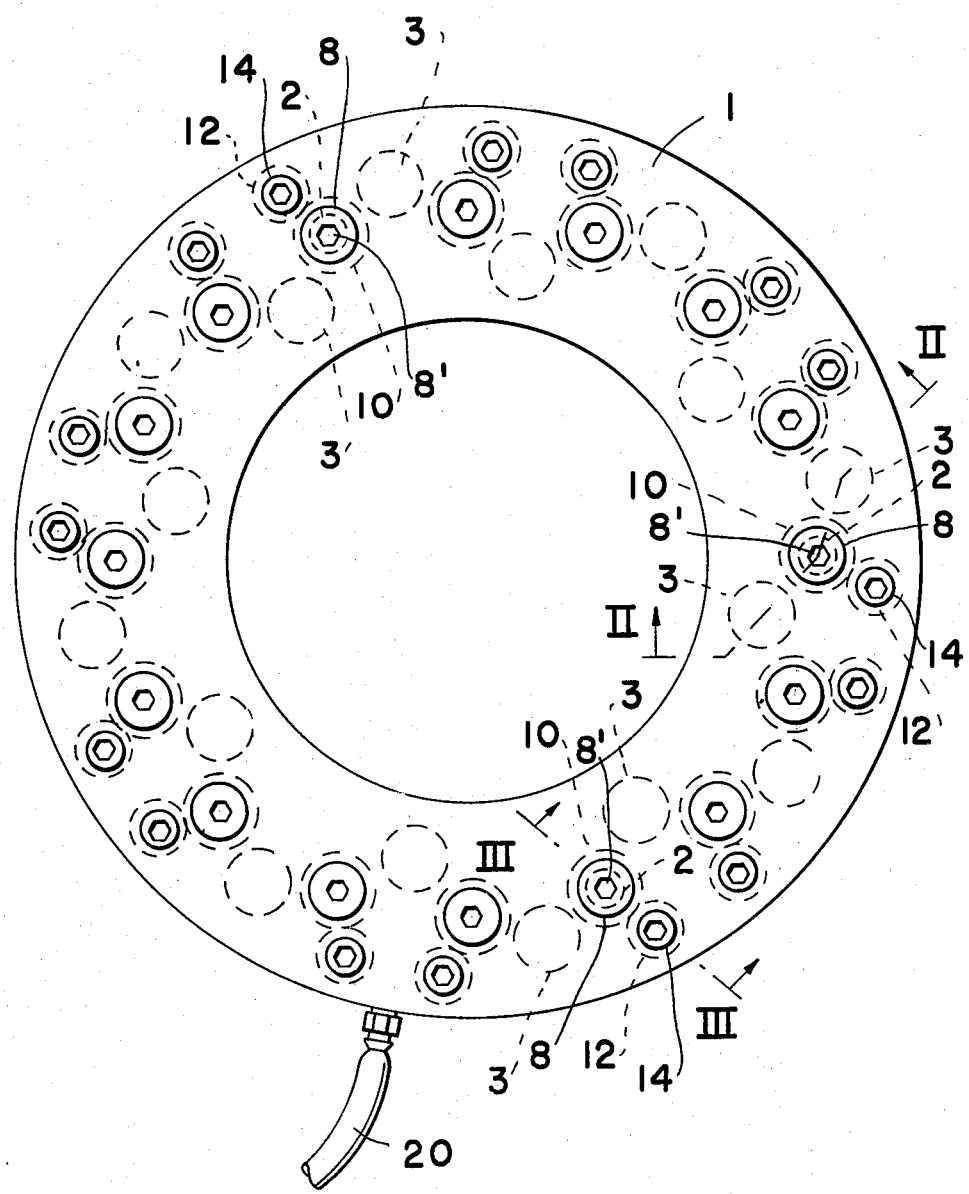
FIG. 1 is a schematic top view of one embodiment of the tensioning device according to the present invention.
Figure 2:
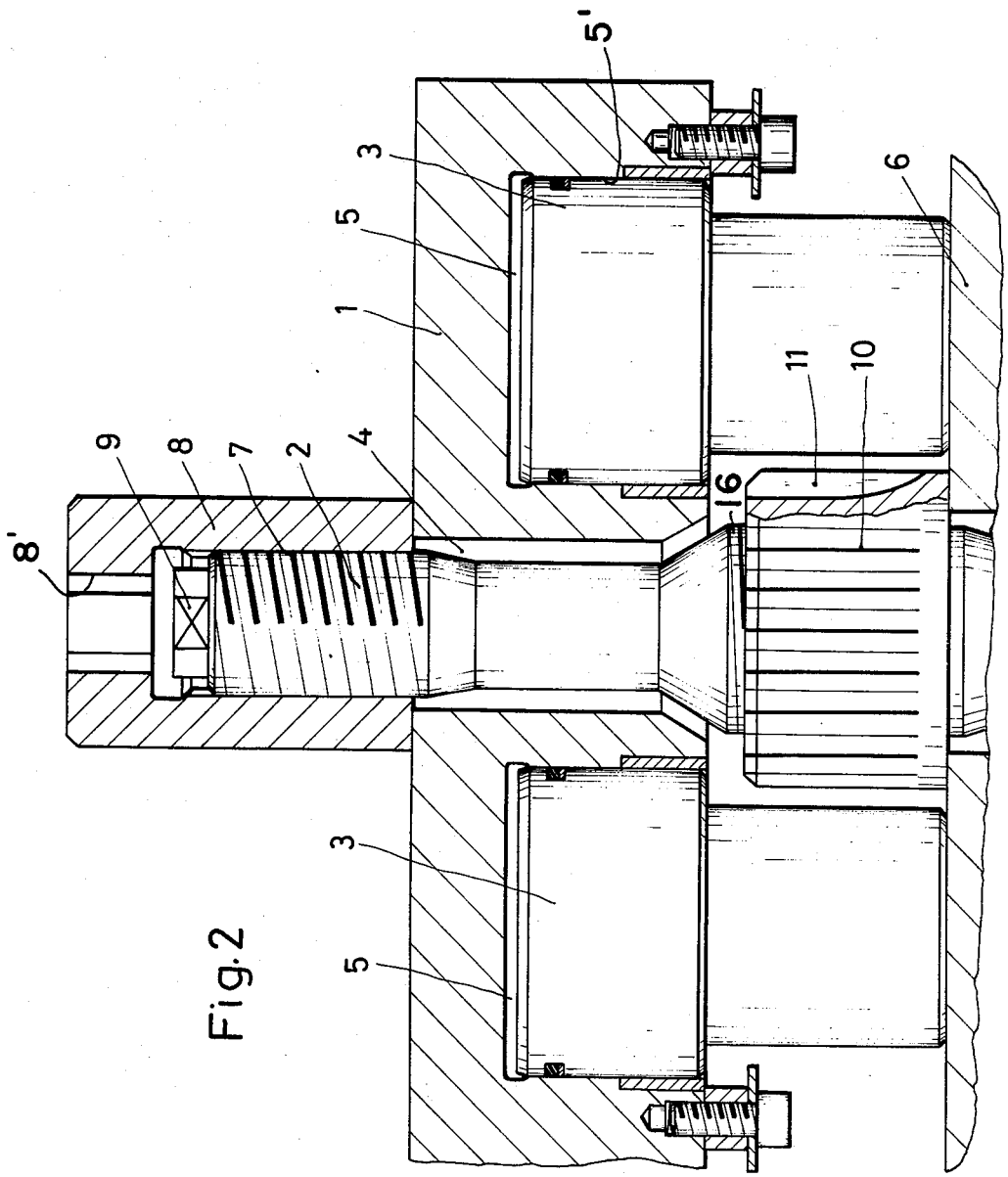
FIG. 2 is a cross-section at an enlarged scale through a pair of tensioning cylinders and a bolt along the line II—II of FIG. 1.
Figure 3:
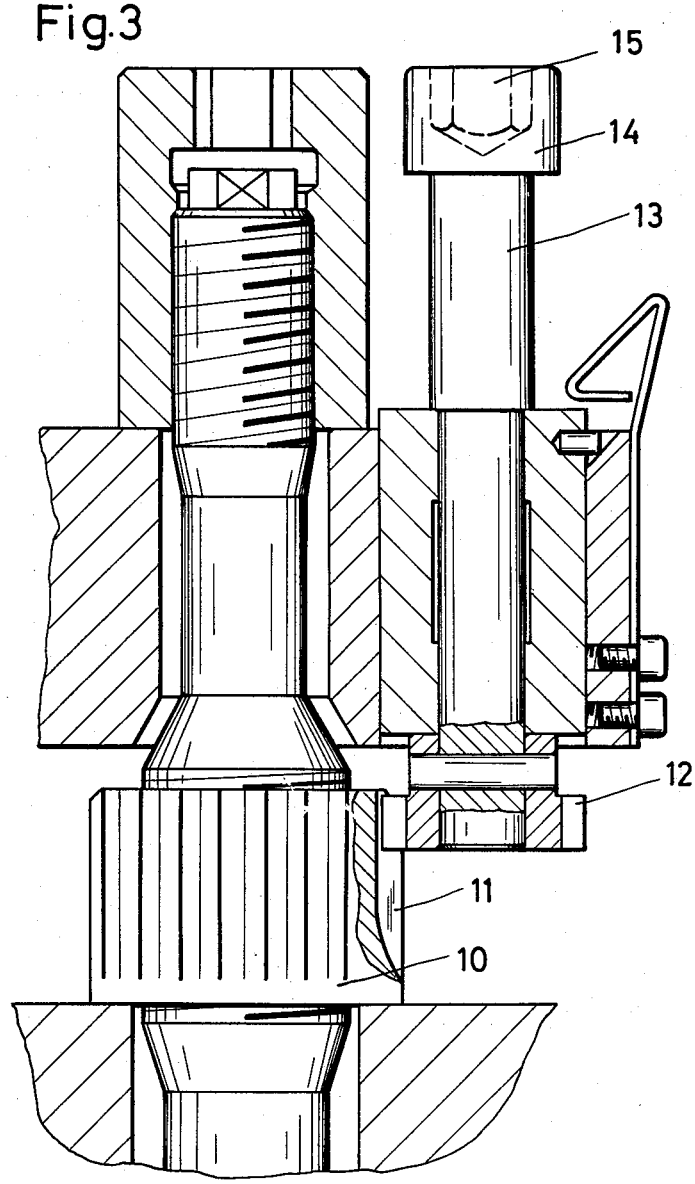
FIG. 3 is a cross-section at an enlarged scale through a device for turning the nut engaging the first body, which cross-section is taken along the line III—III of FIG. 1.
Figure 4:
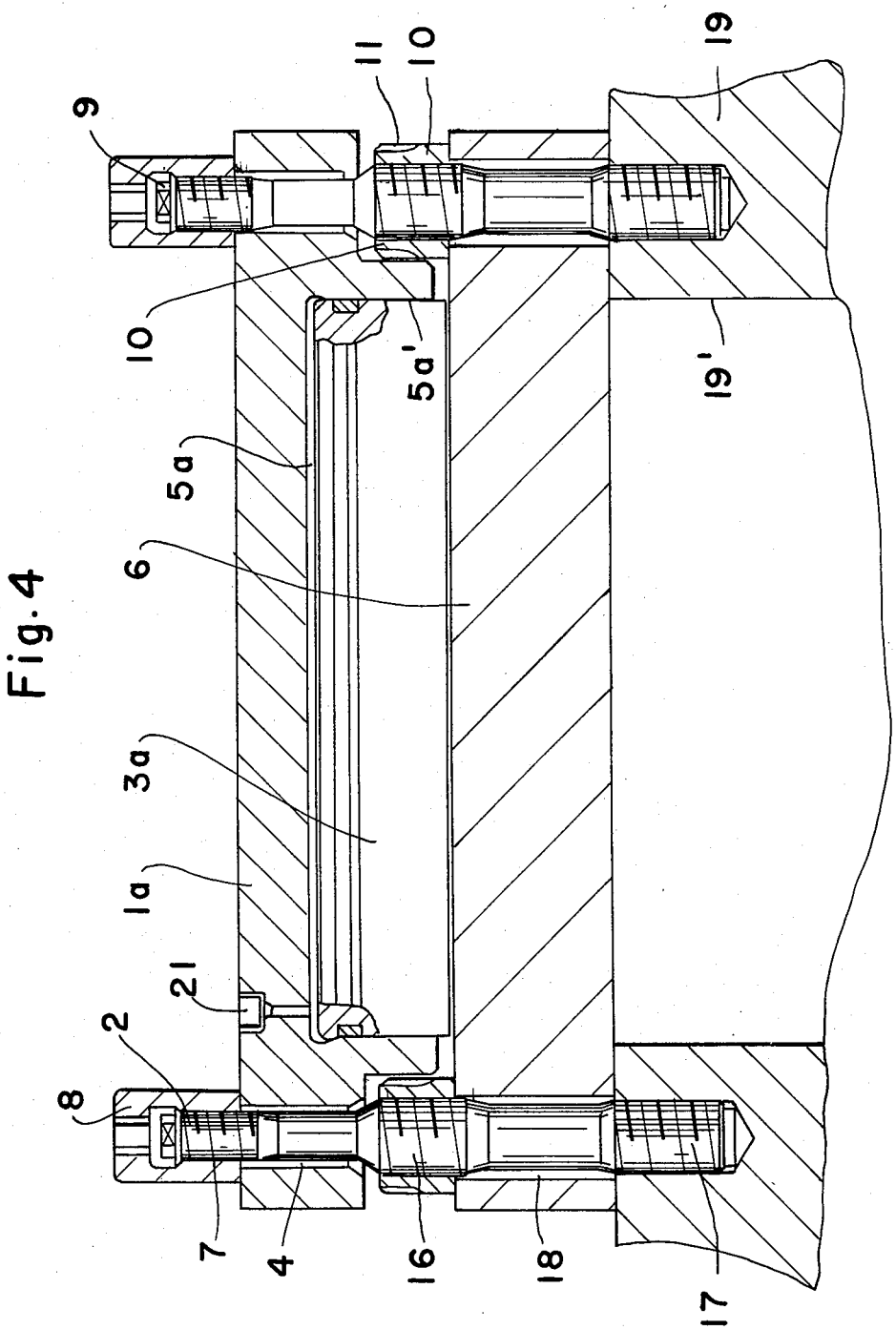
FIG. 4 is a transverse cross-section through another embodiment of the tensioning device according to the present invention.

Referring now to the drawing, and more specifically to FIGS. 1-3 of the same, it will be seen that in this embodiment the tensioning device includes an annular rigid carrier member 1, preferably made from steel, which is formed with a plurality of bores 4 (FIG. 2) therethrough which are arranged equally spaced from each other along a circle concentric with the center of the annular member 1. A screw bolt 2 extends with clearance through each of the bores 4 in the carrier member 1 and also with clearance through corresponding bores in a first body 6 which has to be attached to a second body 19 abutting against the bottom face of the first body, as for instance shown in FIG. 4. As shown in FIG. 4, the body 6 may for instance be a cover plate extending over an opening 19' in the second body 19 which may, for instance, be a heat exchanger or the like, in which the first body 6 has to be tightly attached over the opening of the second body. As likewise shown in FIG. 4, each of the screw bolts has a threaded lower end 17 which is threadingly engaged in a corresponding bore of the second body 19. As shown in FIG. 2, each of the screw bolts 2 has an upper threaded portion 7 and an intermediate threaded portion 16 located between the bottom face of the carrier member 1 and the top face of the first body 6. The upper end of each screw bolt 2 is provided with a hexagonal portion 8 so that the threaded lower end 17 of each screw bolt may be screwed into the bores of the second body 19.

As further shown in FIGS. 1 and 2, the carrier body 1 is also formed with a plurality of cylinder bores 5' having each an upper closed end and a plurality of pistons 3 are slidingly arranged in the cylinder bores 5' and project through the open lower ends of the latter to engage with the lower ends thereof the upper surface of the first body 6. Each of the pistons 3 forms with the upper closed end of the respective cylinder bore 5' a pressure space 5 into which hydraulic fluid is fed during operation of the tensioning device to press the lower end of each piston 3 against the upper surface of the first body 6. FIG. 1 shows also a hose connection 20 which is connected at its end, not shown in the drawing, to a source of hydraulic fluid under pressure, likewise not illustrated. As shown in FIG. 1 the centers of the cylinder bores 5' are arranged equally spaced from each other along two circles concentric with the first circle and one of the mentioned two circles is radially outwardly and the other radially inwardly arranged of the first circle. As shown in FIG. 1, the cylinder bores 5' are arranged in the two circles in a staggered array such that the cylinder bores 5' on the radially inner circle are located respectively between the cylinder bores 5' on the radially outer circle. It is to be understood that appropriate channels are formed in the carrier member 1 for connecting the inner end of the hose 20 to the pressure spaces 5 of all cylinder bores, but for simplification reasons these channels are not shown in any of the FIGS. 1-3.

As best shown in FIG. 2, a cap nut 8 is screwed onto the upper threaded portion 7 of each screw bolt 2 and each of the cap nuts 8 is formed with a central hexagonal opening 8' for engagement with an appropriate key to screw the nuts 8 onto the upper threaded portion 7 of the respective bolts 2, so that the bottom face of each nut engages the upper face of the carrier member 1 as shown in FIG. 2. A further nut 10 is screwed onto the intermediate threaded portion 16 of each bolt into engagement with the upper surface of the first body 6. Each of the nuts 10 is provided at its outer surface with a gearing 11 which meshes, as best shown in FIG. 3, with a pinion 12 carried by a shaft 13 having an axis parallel to that of the respective screw bolt 2 and having at its upper end a head 14 provided with a hexagonal cavity for engagement with a corresponding key, so that the shaft 13 and the pinion 12 connected thereto for rotation therewith, may be turned about its axis, to thereby turn the nut 10, for a purpose as will be described later on in detail. The shaft 13 may be carried on a separate annular member connected in any suitable manner, not shown in the drawing, to the outer peripheral surface of the carrier member 1, as shown in FIG. 3, or the bores through which the shaft 13 extend may be formed in the carrier member 1 itself, as shown in FIG. 1.

The above-described tensioning device will be operated as follows:

At first the lower threaded ends 17 of all of the screw bolts 2 are screwed into the correspondingly threaded bores of the second member 19. The first member 6 is then placed onto the second member 19 so that the bottom face of the first member 6 engages the top face of the second member 19, whereas the plurality of screw bolts 2 extend with clearance through the bores 18 of the first member 6. Subsequently thereto, the nuts 10 are screwed by hand onto the intermediate threaded portion 16 of each screw bolt, so that the bottom face of each nut 10 engages the top face of the first body 6. Subsequently thereto, the carrier member 1 with the pistons 3 is placed onto the thus-assembled parts with the screw bolts 2 extending with clearance through the bores 4 in the carrier member and beyond the upper surface of the latter, while the lower ends of the pistons 3 are in engagement with the upper surface of the first body 6. Thereafter the nuts 8 are screwed onto the upper threaded portions 7 of the bolts 2 with the lower face of each nut engaging the top face of the carrier member 1. Subsequently thereto, hydraulic fluid under pressure is fed simultaneously into all the pressure spaces 5, so that the lower ends of the pistons 3 are pushed simultaneously with considerable force against the upper face of the body 6, while the nuts 8 prevent movement of the carrier member 1 away from the body 6. All of the screw bolts 2 are thus simultaneously and uniformly tensioned and the body or cover plate 6 is tightly pressed against the upper surface of the second body 19. During such tensioning of the screw bolts 2 the bottom faces of the nuts 10 are slightly lifted from the top face of the cover or first body 6. Subsequently thereto, the nuts 10 are then turned by the turning means 12–15, so that the bottom faces of the nuts 11 again tightly engage the top face of the cover 6 to thereby maintain the tension in the screw bolts 2 between the nuts 10 and the threaded lower ends 17 thereof. Pressure fluid can now be discharged from the pressure spaces 5, the nuts 8 unscrewed from the upper threaded portions 7 of the screw bolts and the carrier member 1 with the pistons 3 removed from the body 6.

FIG. 4 illustrates a second embodiment of the tensioning device according to the present invention which differs from the above-described embodiment shown in FIGS. 1–3 only in that the carrier member 1a is only provided with a single central cylinder bore 5a' of rather large diameter in which a corresponding single piston 3a is slidably arranged to form with the upper closed end of the cylinder bore 5a' a single pressure space 5a into which fluid may be fed through a passage 21 which is to be connected to the hose 20 illustrated in FIG. 1. Otherwise, the arrangement of the tensioning device shown in FIG. 4 is very similar to that shown in FIGS. 1–3, above described. The plurality of screw bolts 2 are again screwed with the lower threaded end portions 17 into correspondingly threaded bores of the second body 19 to extend with clearance through bores 18 into the first body or cover 6 and with clearance also through corresponding bores 4 in the carrier member 1a. Each of the screw bolts 2 has an intermediate threaded portion 16 onto which nuts 10 provided with an outer gearing 11 are screwed and onto the upper threaded portions 7 of each screw bolt a cap nut 8 is again screwed. For simplification reasons the turning means 12–15 shown in FIG. 3 are not illustrated in FIG. 4, but it is to be understood that such turning means are provided for each of the nuts 10 with the pinion 12 of each turning means in engagement with the gearing 11.

The modified tensioning device shown in FIG. 4 will be operated in a similar manner as the modification illustrated in FIGS. 1–3 and it is believed unnecessary to repeat description of this procedure. The modification shown in FIG. 4 has the advantage over the modification shown in FIGS. 1–3 that it can be manufactured in a simpler manner and since only one piston is provided, all of the screw bolts 2 will be tensioned in exactly the same manner.

Figure 5:
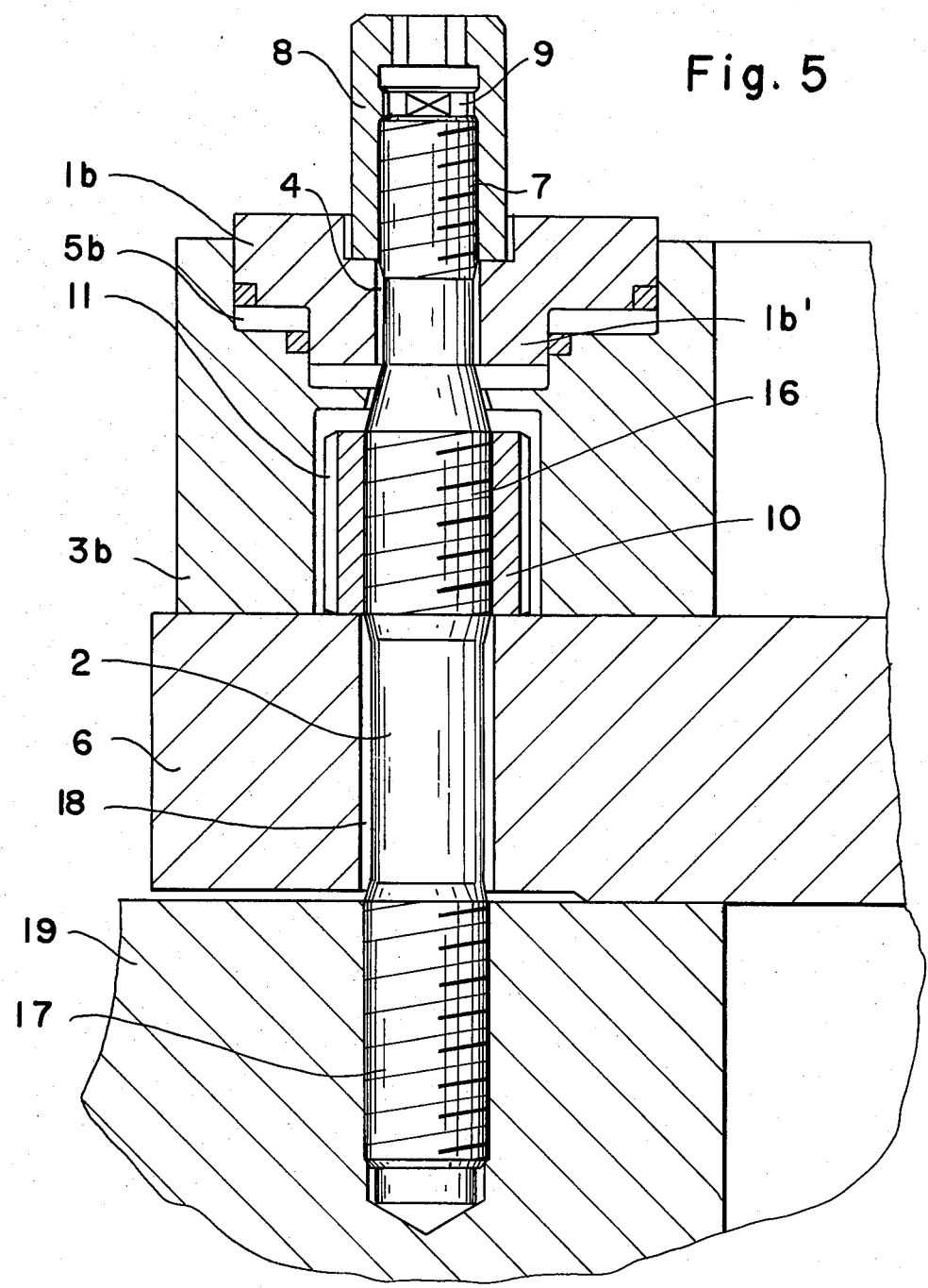
FIG. 5 is a partial transverse cross-section through a further embodiment of a tensioning device according to the present invention.

FIG. 5 illustrates a third embodiment of a tensioning device according to the present invention. In this embodiment, the carrier member 1b is formed by a stepped annular member having a lower portion 1b' of a smaller width than an upper portion thereof and the single piston 3b is likewise formed in the upper portion thereof with a correspondingly stepped annular groove into which the portions of the carrier member 1b are slidingly arranged in a sealed moment to form an annular pressure space 5b into which hydraulic fluid may again be fed through a passage, not shown in FIG. 5, to thereby press the bottom face of the piston 3b in tight engagement with the top face of the first member 6. The plurality of screw bolts, only one of which is shown in FIG. 5, are again screwed with their lower threaded ends 17 into correspondingly threaded bores of the second body 19 to project therefrom with clearance through aligned bores in the first body or cover member 6 and a nut 10 is again screwed on the intermediate threaded portion 16 of each screw bolt, whereas a cap nut 8 is again screwed onto the upper threaded portion 7 of each screw bolt 2. The nuts 10 are again provided with an outer gearing 11 and it is to be understood that the piston 3b is formed with corresponding cutouts so that the nuts 10 may be turned with turning means 12–15 as shown in FIG. 3.

The embodiment shown in FIG. 5 will be operated in a similar manner as described above in connection with FIGS. 1–3.

The advantage of the embodiment shown in FIG. 5 is that it is lighter than the embodiment shown in FIG. 4 and the embodiment shown in FIGS. 1–3 and it has the further advantage over that shown in FIG. 4 that no bending force whatsoever is applied to the screw bolts 2 during tensioning of the same. In the embodiment shown in FIG. 4, this disadvantage may be avoided by making the carrier member 1a as stiff as possible.

It will be understood that each of the elements described above, or two or more together, may also find a useful application in other types of tensioning devices differing from the types described above.

While the invention has been illustrated and described as embodied in a fluid-operated tensioning device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for simultaneously and equally tensioning a plurality of bolts connecting a first body to a second body with one end face of the first body abutting against the corresponding face of the second body, in which the bolts are axially immovably secured in the region of one of the ends thereof to said second body and project from the latter with clearance through bores in said first body and beyond the latter, said device comprising a single carrier member on the side of the first body facing away from the second body, said carrier member being formed with a plurality of bores therethrough respectively aligned with the bores in the first body and said bolts extending with clearance through said bores of said carrier member and projecting with end portions thereof beyond the latter, each of said bolts having an intermediate threaded portion projecting beyond a face of said first body opposite said one end face; means on said end portion of each bolt for preventing movement of said carrier member away from the first body; fluid operated cylinder and piston means between said carrier member and said opposite face of said first body for pressing said carrier member away from said first body in tight engagement with said first mentioned means to thereby simultaneously transmit equal tension forces to all of said bolts; and a nut screwed onto said intermediate portion of each bolt to be turned into engagement with said opposite face of the first body after all of said bolts have thus been simultaneously tensioned with said equal tension forces so as to hold the first body in tight engagement with said second body by said tension bolts.

2. A tensioning device as defined in claim 1, wherein said end portion of each bolt is provided with a screw thread, and wherein said means on said end portion of each bolt is a nut screwed onto the threaded end portion of each bolt.

3. A tensioning device as defined in claim 2, wherein said carrier member is an annular member.

4. A tensioning device as defined in claim 1, wherein said carrier member is a rigid plate, and wherein said fluid-operated cylinder and piston means comprise a central cylinder bore in said plate having a closed end and an opposite open end facing said first body, a piston slidably guided in said cylinder bore and projecting through said open end to engage with one end said first body and forming between its other end and said closed end of said bore a pressure space, and means for feeding fluid under pressure into said pressure space.

5. A tensioning device as defined in claim 4, wherein said plurality of bores through said carrier member through which said bolts extend are arranged along a circle radially outwardly spaced from said cylinder bore.

6. A tensioning device as defined in claim 3, wherein said carrier member is a rigid annular member, said plurality of bores in said carrier member through which said bolts extend are arranged equally spaced from each other along a first circle coaxial with said annular member, and wherein said fluid-operated cylinder and piston means comprise a plurality of cylinder bores having each a closed end and an open end facing said first body, a plurality of pistons respectively slidably guided in said plurality of said cylinder bores and projecting through the open ends of said bores to each engage with one end said first body and each forming between its other end and the closed end of the respective cylinder bore a pressure space, and means for simultaneously feeding fluid under pressure in all of the pressure spaces, the centers of said cylinder bores being respectively arranged along two circles respectively radially inwardly and radially outwardly spaced from the first circle.

7. A tensioning device as defined in claim 6, wherein the number of cylinder bores in each of the two circles is half the number of bores in said first circle, and wherein the cylinder bores in the two circles are arranged staggered with respect to the bores in the first circle so that two cylinder bores are arranged substantially diametrically opposite at each of the bores in the carrier member through which the bolts respectively project.

8. A tensioning device as defined in claim 3, wherein said fluid-operated cylinder and piston means comprise an annular piston abutting with an end face thereof against said first body and being provided with a stepped annular groove extending from a face opposite said end face of said piston into the latter and having a first annular portion of greater width at said opposite face and a second annular portion of smaller width further spaced from said opposite face, and wherein said annular carrier member has a first annular portion slidably arranged in a sealed member in said first groove portion of said piston and a second annular portion slidably arranged in a sealed manner in said second grooved portion of said piston to form in said first grooved portion an annular pressure space, and means for feeding fluid under pressure into said annular pressure space.

9. A tensioning device as defined in claim 1, wherein each of said nuts screwed onto said threaded intermediate portion of said bolt is provided with an outer gearing and including a pinion for each nut meshing with said outer gearing thereof, and means carried by said carrier member for turning the pinions about the axes thereof and therewith turning the nuts on said intermediate portion of said bolts into tight engagement with said opposite end face of said first body.

10. A tensioning device as defined in claim 1, wherein said bolts are screwed into correspondingly threaded bores of said second body.

* * * * *